United States Patent [19]

Fenelon

[11] Patent Number: 5,452,622
[45] Date of Patent: * Sep. 26, 1995

[54] STRESS DISSIPATION GEAR

[75] Inventor: Paul J. Fenelon, Nashville, Tenn.

[73] Assignee: Magi, L.P., Nashville, Tenn.

[ * ] Notice: The portion of the term of this patent subsequent to May 3, 2011 has been disclaimed.

[21] Appl. No.: 160,544

[22] Filed: Dec. 1, 1993

Related U.S. Application Data

[63] Continuation-in-part of Ser. No. 15,332, Feb. 9, 1993, Pat. No. 5,307,705.

[51] Int. Cl.$^6$ .......................... F16H 55/14; B29C 45/14
[52] U.S. Cl. ............................. 74/411; 29/527.1; 29/893; 29/893.37; 74/432; 74/443; 74/DIG. 10; 264/242; 264/250; 264/261; 264/263; 464/75; 464/82; 464/87; 464/89; 464/91; 464/160
[58] Field of Search .................... 29/527.1, 893, 29/893.37; 74/411, 432, 439, 443, DIG. 10; 264/242, 250, 261, 263; 464/73, 74, 75, 81, 82, 84, 87, 91, 100, 160

[56] References Cited

U.S. PATENT DOCUMENTS

| | | | |
|---|---|---|---|
| 284,290 | 9/1883 | Gilliland | 74/411 X |
| 287,711 | 10/1883 | Ortman | 74/443 X |
| 288,134 | 11/1883 | Stone, Jr. | 74/443 |
| 312,780 | 2/1885 | Wilcox | 74/443 |
| 314,472 | 3/1885 | Plamondon | 74/443 |
| 379,022 | 3/1888 | Morgan | 74/443 |
| 680,654 | 8/1901 | Gomber | 74/443 |
| 820,789 | 5/1906 | Hutchins | 74/443 X |
| 1,060,865 | 5/1913 | Sundh | 464/75 X |
| 1,424,203 | 8/1922 | Keller | 74/443 X |
| 1,589,795 | 6/1926 | Emrich . | |
| 1,674,226 | 6/1928 | Reed . | |
| 1,780,727 | 11/1930 | Tenney | 464/75 |
| 1,928,763 | 10/1933 | Rosenberg | 74/443 X |
| 2,004,712 | 6/1935 | Thiry | 464/87 X |
| 2,187,706 | 1/1940 | Julien | 464/90 |
| 2,260,869 | 10/1941 | Ruesenberg . | |
| 2,307,129 | 1/1943 | Hines et al. | 74/443 X |
| 2,380,776 | 7/1945 | Miller | 74/443 |
| 2,460,630 | 2/1949 | Fawick | 74/411 |
| 2,560,644 | 7/1951 | Hartzell | 464/75 |
| 2,702,995 | 3/1955 | Biedess | 74/411 X |
| 2,753,731 | 7/1956 | McWethy | 74/443 |
| 2,857,777 | 10/1958 | Porter | 74/432 |
| 2,869,388 | 1/1959 | Kreis | 74/443 |
| 2,939,331 | 6/1960 | Weeks | 74/443 |
| 2,955,481 | 10/1960 | Jackel | 74/438 |
| 2,956,187 | 10/1960 | Wood | 310/75 |
| 2,961,856 | 11/1960 | Selzer . | |
| 3,020,036 | 2/1962 | Kleinschmidt | 267/1 |
| 3,057,220 | 10/1962 | Parr | 74/443 |
| 3,071,850 | 1/1963 | Hauschalter | 29/450 |
| 3,216,267 | 11/1965 | Dolza | 74/411 X |
| 3,218,828 | 11/1965 | Thelander . | |
| 3,257,860 | 6/1966 | Runde et al. | 74/411 X |
| 3,304,795 | 2/1967 | Rouverol | 74/411 |
| 3,360,998 | 1/1968 | Griffel | 74/411 X |
| 3,375,911 | 4/1968 | Smirl . | |
| 3,406,583 | 10/1968 | Baier | 74/411 |
| 3,557,573 | 1/1971 | Hansgen . | |
| 3,565,223 | 2/1971 | Pierce | 192/106.1 |
| 3,667,317 | 6/1972 | Hillingrathner | 74/443 X |
| 3,757,608 | 9/1973 | Willner | 74/411 X |
| 3,885,657 | 5/1975 | Sato | 192/106.1 X |
| 3,943,788 | 3/1976 | Kummel et al. | 74/411 |
| 3,952,546 | 4/1976 | Nakano et al. | 464/90 |
| 4,178,811 | 12/1979 | Shepherd | 74/574 |

(List continued on next page.)

FOREIGN PATENT DOCUMENTS

| | | |
|---|---|---|
| 4-282053 | 10/1992 | Japan . |
| 682196 | 11/1952 | United Kingdom . |
| 759215 | 10/1956 | United Kingdom . |
| 792330 | 3/1958 | United Kingdom ..... 74/411 |
| 989898 | 4/1965 | United Kingdom ..... 74/411 |

*Primary Examiner*—Allan D. Herrmann
*Attorney, Agent, or Firm*—Harness, Dickey & Pierce

[57] ABSTRACT

A gear is comprised of a central radial hub, a radial gear-toothed rim and a stress dissipating structure.

57 Claims, 10 Drawing Sheets

U.S. PATENT DOCUMENTS

| | | | |
|---|---|---|---|
| 4,241,818 | 12/1980 | Miller | 192/106.1 X |
| 4,296,851 | 10/1981 | Pierce | 192/106.1 |
| 4,296,853 | 10/1981 | Kronert | 192/106.1 |
| 4,296,854 | 10/1981 | Staub, Jr. | 192/106.1 |
| 4,300,670 | 11/1981 | Mathues | 192/106.1 |
| 4,328,879 | 5/1982 | Tone | 74/411 X |
| 4,474,276 | 10/1984 | Loizeau | 192/106.1 |
| 4,511,186 | 4/1985 | Sasamoto | 474/161 X |
| 4,541,296 | 9/1985 | Oyafuso | 74/425 |
| 4,552,543 | 11/1985 | Wolf et al. | 192/106.1 |
| 4,560,367 | 12/1985 | Wolf et al. | 192/106.1 X |
| 4,609,088 | 9/1986 | Takeuchi | 192/106.1 |
| 4,615,096 | 10/1986 | Foster | 192/106.1 X |
| 4,616,742 | 10/1986 | Matsushita | 192/106.1 X |
| 4,624,351 | 11/1986 | Lutz et al. | 192/106.1 X |
| 4,646,899 | 3/1987 | Murakami | 192/106.1 |
| 4,674,351 | 6/1987 | Byrd | 74/443 |
| 4,680,979 | 7/1987 | Morishita et al. | 74/411 X |
| 4,709,796 | 12/1987 | Uenohara | 192/106.1 |
| 4,764,152 | 8/1988 | Jorg et al. | 464/89 |
| 4,793,455 | 12/1988 | Tabuchi et al. | 192/106.1 X |
| 4,913,275 | 4/1990 | Kobayashi et al. | 192/106.1 |
| 4,951,515 | 8/1990 | Morishita et al. | 74/7 E |
| 5,127,279 | 7/1992 | Barthruff | 74/411 X |
| 5,138,902 | 8/1992 | Muller et al. | 192/106.1 X |
| 5,147,246 | 9/1992 | Focqueur et al. | 192/106.1 X |
| 5,195,625 | 3/1993 | Chang et al. | 192/106.1 X |
| 5,230,415 | 7/1993 | Ament et al. | 192/106.2 |
| 5,307,705 | 5/1994 | Fenelon | 74/411 |
| 5,360,090 | 11/1994 | Stretch et al. | 192/106.2 X |

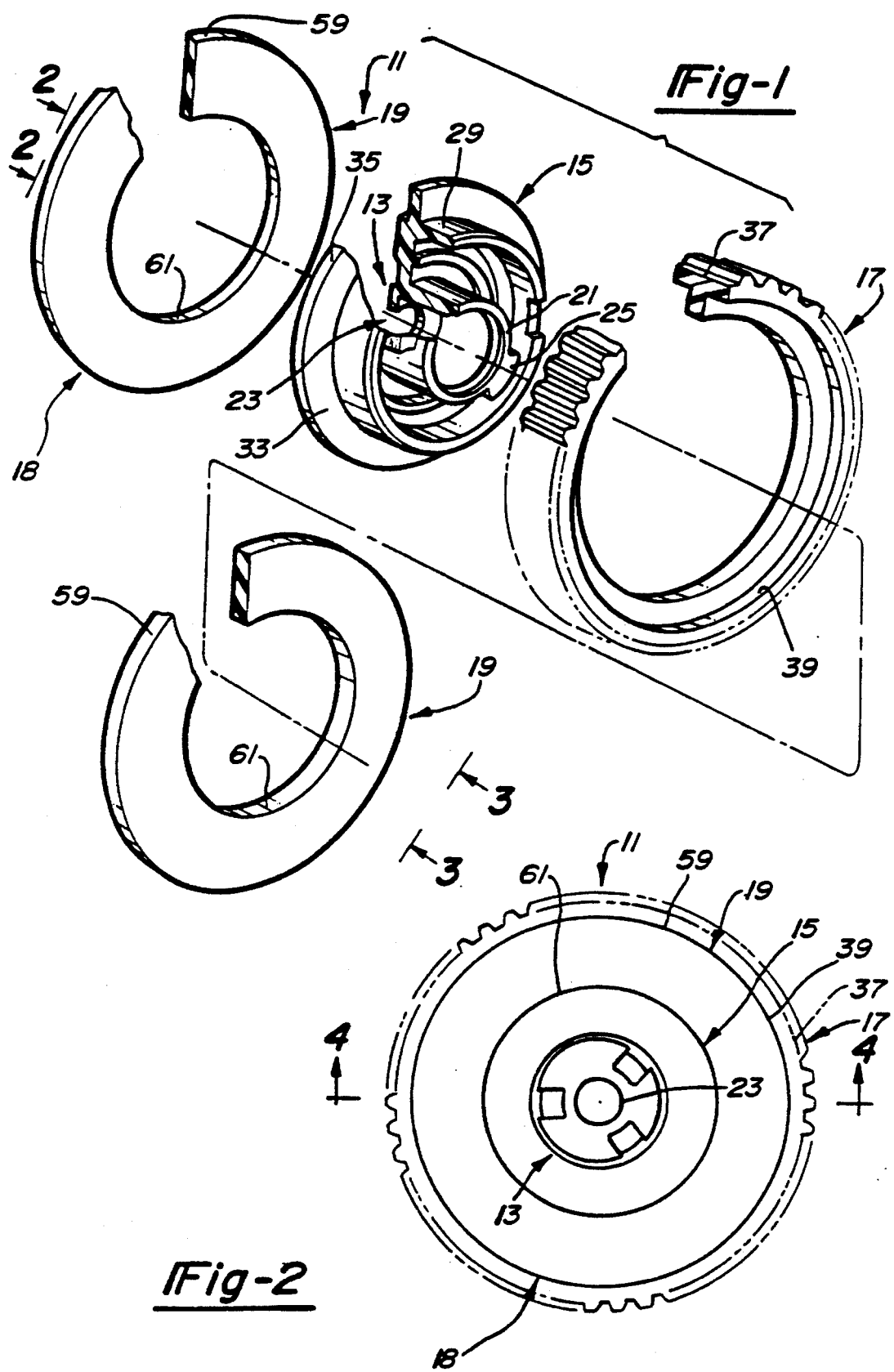

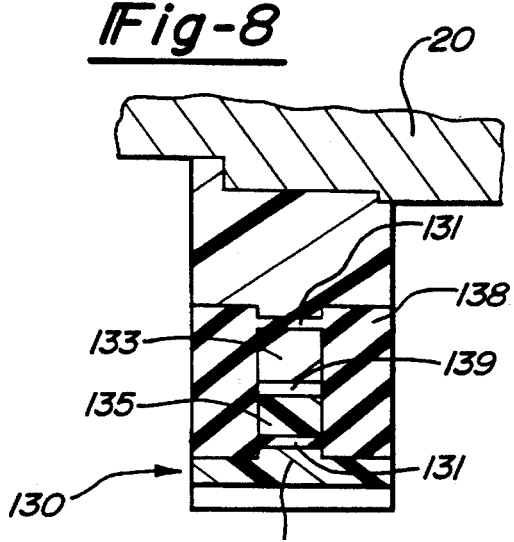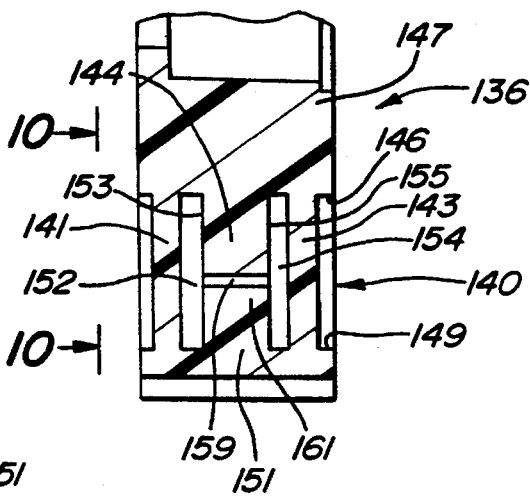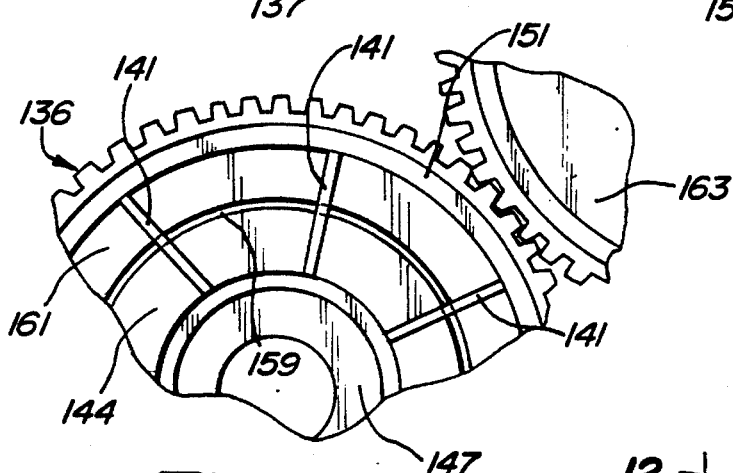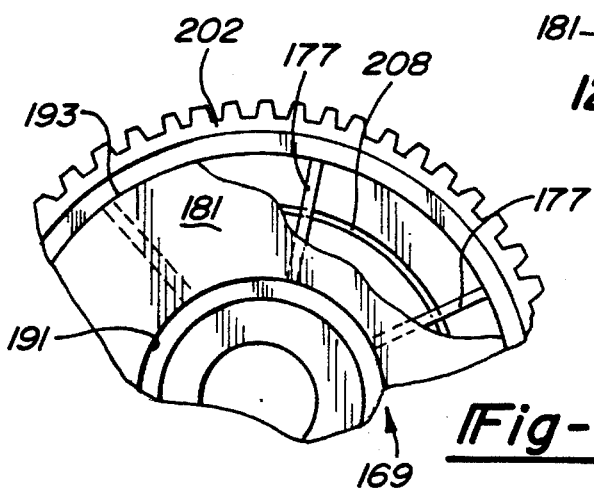

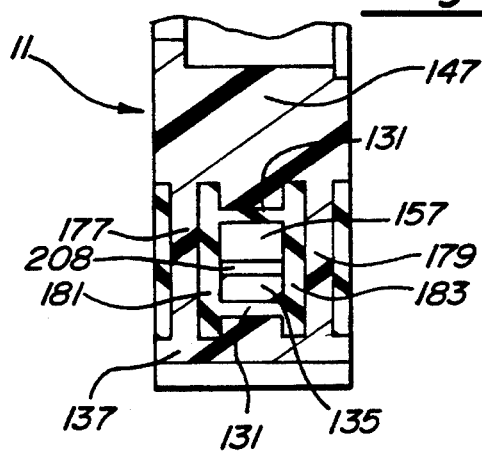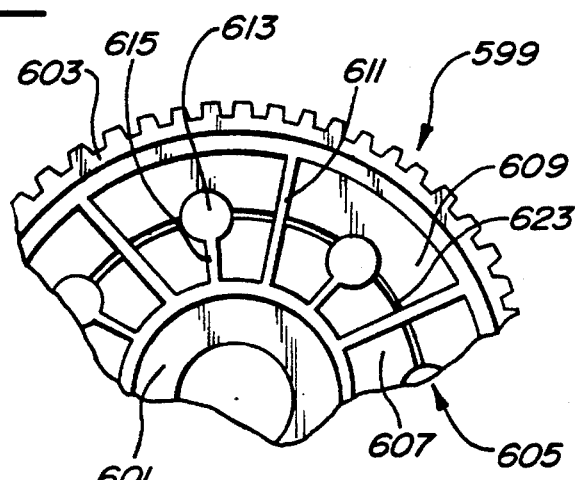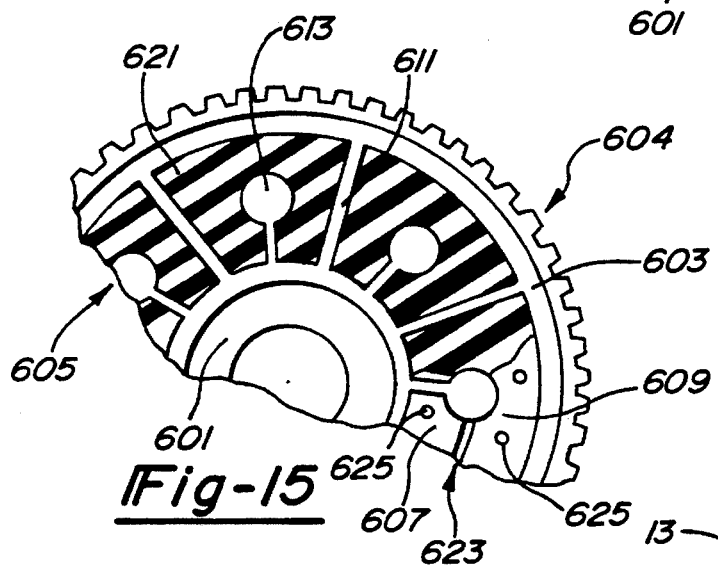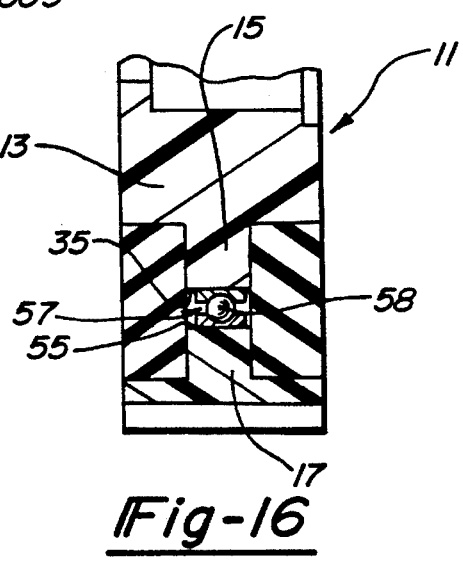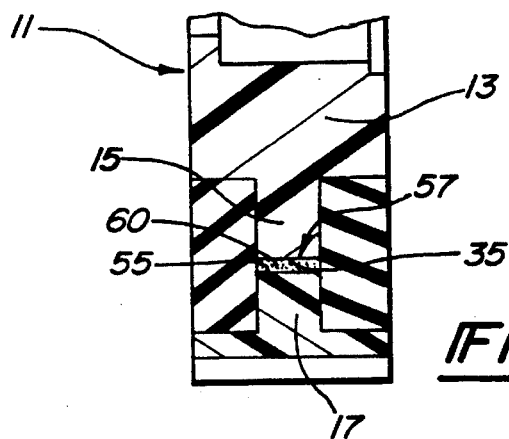

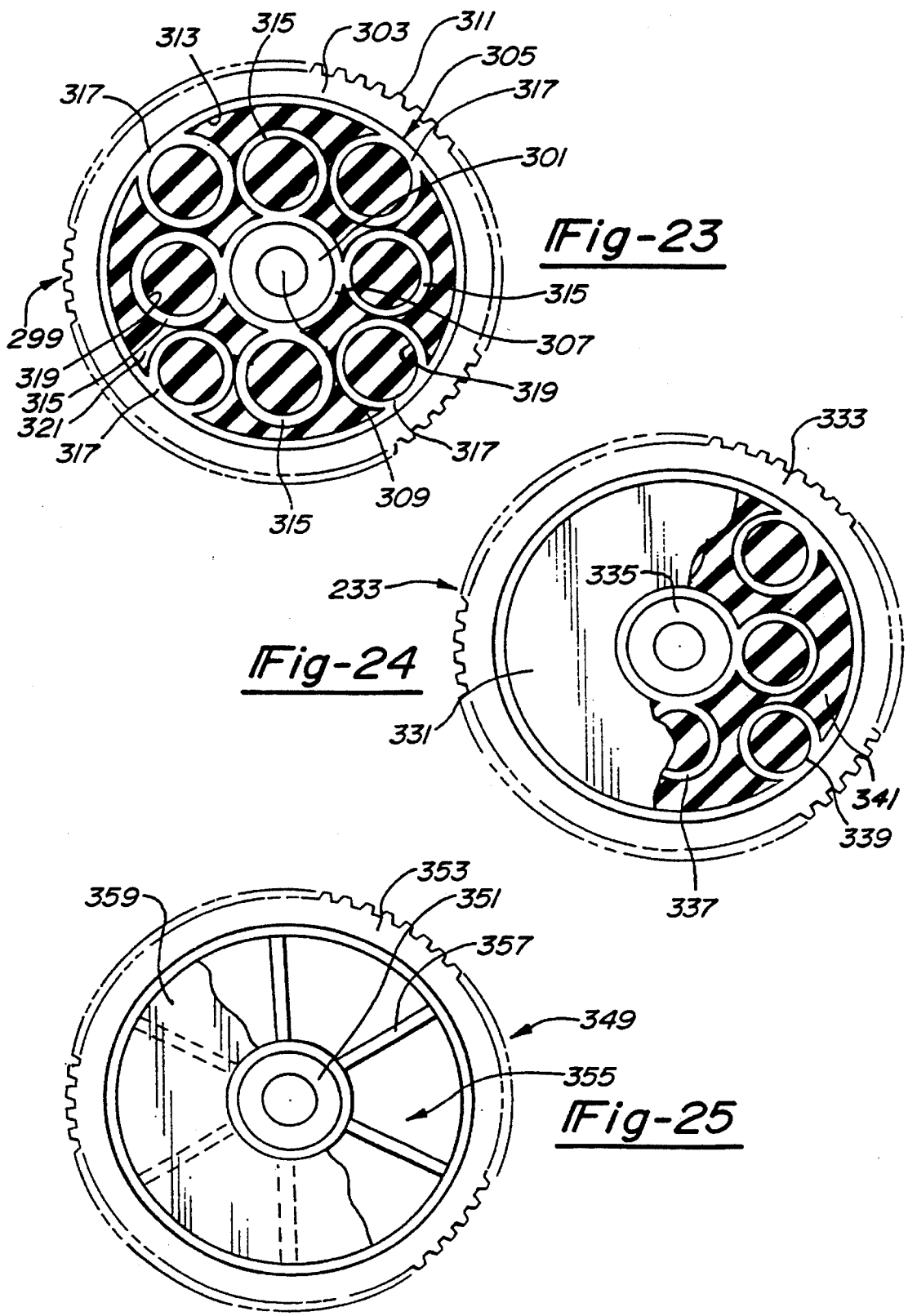

STRESS DISSIPATION GEAR

CROSS REFERENCE TO RELATED APPLICATION

This is a continuation-in-part of application Ser. No. 08/015,332, filed Feb. 9, 1993 now U.S. Pat. No. 5,307,705.

BACKGROUND OF THE INVENTION

This invention relates generally to gears and specifically to gears having a central radial hub, a radial gear-toothed rim and a stress dissipating resilient structure interconnecting the hub and rim.

The primary function of a gear is to transmit power from a power generating source to an operating device. This is achieved through the intermeshing and continuity of action between the teeth of a driving gear which is associated with the power source and the teeth of the mating gear which is associated with the operating device. Since a gear is a rotating body, a state of dynamic equilibrium must be attained. Therefore, to be in dynamic equilibrium all of the reactions from the rotating gear must be neutralized by equal and opposite forces supporting the gear shaft.

Traditional gear design comprises a central hub, a web extending radially outward therefrom which is, in turn, peripherally bordered by an integral radial rim having geared teeth thereupon. Gear failure can occur if manufacturing tolerances, material type, and gear design are not matched to the service application. Furthermore, since gears have historically been manufactured from a single homogeneous material, the bulk rigidity and strength of the web is greater than that of the hub and rim. Thus, torsional stresses created through start-up, shut-down, overload, or through cyclical fatigue are localized in the teeth and hub areas. As a result, gears typically fail at the root of the teeth or in the hub region. Such failures include excessive wear, plastic flow or creep, tooth bending fatigue, contact fatigue (pitting and spalling), thermal fatigue, tooth bending impact, tooth shear, tooth chipping, case crushing, torsional shear and stress ruptures. Many of these failures are due primarily to overload, cycling fatigue, and/or start-up and shut-down rotational shock referenced above that is especially prevalent in gears that perform in non-constant rotation service applications.

An alternative gear design that has been used is a compliant gear having a rigid one-piece hub and web, and a separate rim member with a rubber-like insert or ring located between the outer radial edge of the web and the inner radial edge of the rim. An example of this configuration is disclosed in U.S. Pat. No. 2,307,129 entitled "Shock Proof Gear", issued to Hines et al. on Jan. 5, 1943. Although this rubber-like insert is supposed to dampen audible vibrations and somewhat reduce resultant stresses within the gear, under load the rim is capable of compressing one side of the rubber-like insert such that the rotational axis of the rim could become axially offset from the rotational axis of the hub. This misalignment can cause partial or complete disengagement of the gear teeth of the compliant gear from those of its mating gear. In addition, gears having this type of rubber-like insert strictly between the web and the rim are subject to the rim torquing away from the hub in a transverse direction normal to the direction of rotation. Under load this transverse movement may also cause misalignment of the mating gear teeth which will localize stresses upon distinct portions of each tooth. Moreover, the hub and rim may not provide an adequate attachment surface for the rubber-like insert in extreme torque situations. A similar design using elastomeric laminates with a shim therebetween is disclosed in U.S. Pat. No. 4,674,351 entitled "Compliant Gear", issued to Byrd on Jun. 23, 1987.

Another compliant gear configuration is disclosed in FIG. 8 of U.S. Pat. No. 3,216,267 entitled "Rotary Motion Transmitting Mechanism For Internal Combustion Engines And The Like", issued to Dolza on Nov. 9, 1965. That gear design contains a stamped cup-shaped hub which has an outward radially extending flange and a cushioning member fully attached to the side thereof. The rim of the gear has a generally L-shaped cross section with the radial inward leg being fully attached to the opposite side of the cushioning member. In that design there are gaps between the outer circumference of the cushioning member and the inside radial surface of the rim and also a gap between the radially inward surface of the cushioning member and the radially outward horizontal edge of the cup-shaped hub section. While the gear is designed to maintain angular torsional rigidity while having radial flexibility, under load the rim of the gear may become elliptical and thus encroach upon the gaps created above and below the cushioning member. Moreover, the rotational axis of the rim of that gear may also become offset from the rotational axis of the hub under working conditions.

SUMMARY OF THE INVENTION

In accordance with the present invention, a stress dissipation gear is provided which is comprised of a central radial hub, a radial gear-toothed rim and a stress dissipating resilient structure. The stress dissipating resilient structure radially couples the rim to the hub. In one aspect of the stress dissipation gear of the present invention, the stress dissipating structure includes an elastomeric material and a web which radially extend outward from the hub. The elastomeric material is laterally supported by the adjacent web and the side walls of the elastomeric material are proximately parallel to the web side wall surfaces such that there is no elastomeric material located between the outer peripheral edge of the web and the inner peripheral edge of the rim. In another aspect of the stress dissipation gear of the present invention, the stress dissipating structure includes a plurality of rotationally flexible spoke-like structures radially extending between the rim and the hub. In a further aspect of the stress dissipation gear of the present invention, the stress dissipating structure includes the elastomeric material in addition to a plurality of spokes. An additional aspect of the stress dissipation gear of the present invention provides a stress dissipating structure having a plurality of spokes acting in association with adjacent stops. In still another preferred aspect of the present invention, the stress dissipating structure includes a plurality of rotatably deformable formations. Furthermore, the present invention comprises a process by which a stress dissipation gear is manufactured.

The configuration of the gear of the present invention is advantageous over conventional gears in that the present invention allows the stress dissipating structure to absorb structural stresses created between the hub and the gear-toothed rim due to instantaneous shocks created by gear start-up or shut-down, cyclical fatigue, and/or overload. Furthermore, the stress dissipating resilient structure supplies lateral planar rigidity thereby resisting angular torsional deformation in a direction normal to the rotational axis between the rim and the hub. Moreover, in some embodiments of the present invention, the close relationship of the web's outer peripheral edge to the rim's inner peripheral edge, without the elastomeric material therebetween, prevents rotational axis misalignment between the rim and the hub. In other embodiments a separate one or more plate members are positioned on one or both transverse outer surfaces extending between the hub and rim.

By matching the bulk torsional rigidity and allowed torsional deformations of the stress dissipating structure, which can be a function of its modulus of elasticity, its dimensional thickness or the specific formations chosen, to that of the geared-tooth performance proportions, the beneficial characteristics of a conventional single piece homogenous gear are maintained while the resilient structure acts to synergistically dissipate stresses between the gear-toothed rim and the hub. The present invention construction and process to manufacture such a gear may be applied to a wide variety of power transmitting assemblies including parallel axis spur and helical gear sets, to nonparallel coplanar intersecting axis bevel and face gears, to nonparallel noncoplanar nonintersecting axis worm, hypoid, spiroid and helican gears, and to special square, rectangular, triangular, elliptical or scroll gears.

Additional objects, advantages, and features of the present invention will become apparent from the following description and appended claims, taken in conjunction with the accompanying drawings.

BRIEF DESCRIPTION OF THE DRAWINGS

FIG. 1 is an exploded perspective view, with portions broken away therefrom, of a first preferred embodiment of a stress dissipation gear of the present invention;

FIG. 2 is a side elevational view, taken from FIG. 1 in the direction of arrows 2—2, of the first preferred embodiment of the present invention gear;

FIG. 8 is a fragmentary cross-sectional view, similar to that shown in FIG. 4, of a further preferred embodiment of the present invention gear;

FIG. 9 is a fragmentary cross-sectional view, similar to that shown in FIG. 4, of another preferred embodiment of the present invention gear;

FIG. 10 is a fragmentary side elevational view of the present invention, taken in the direction of arrows 10—10 of FIG. 9;

FIG. 11 is a fragmentary cross-sectional view, similar to that shown in FIG. 4, of a further preferred embodiment of the present invention gear;

FIG. 12 is a fragmentary side elevational view of the present invention shown partially in section and taken in the direction of arrows 12—12 of FIG. 11;

FIG. 13 is a fragmentary cross-sectional view, similar to that shown in FIG. 4, of a further preferred embodiment of the present invention gear;

FIG. 14 is a fragmentary side elevational view of another preferred embodiment of the present invention gear;

FIG. 15 is a fragmentary side elevational view of a further preferred embodiment of the present invention gear;

FIG. 16 is a fragmentary cross-sectional view, similar to that shown in FIG. 4, of a first alternate embodiment used in combination with the preferred embodiment of the present invention gear of FIG. 1;

FIG. 17 is a fragmentary cross-sectional view, similar to that shown in FIG. 4, of a second alternate embodiment used in combination with the preferred embodiment of the present invention gear of FIG. 1;

FIG. 23 is a diametral sectional view of a further preferred embodiment of the present invention gear;

FIG. 24 is a side elevational view, partially in section, of a further preferred embodiment of the present invention gear;

FIG. 25 is a side elevational view, partially in section, of another preferred embodiment of the present invention gear;

DETAILED DESCRIPTION OF THE PREFERRED EMBODIMENTS

Figure 3:
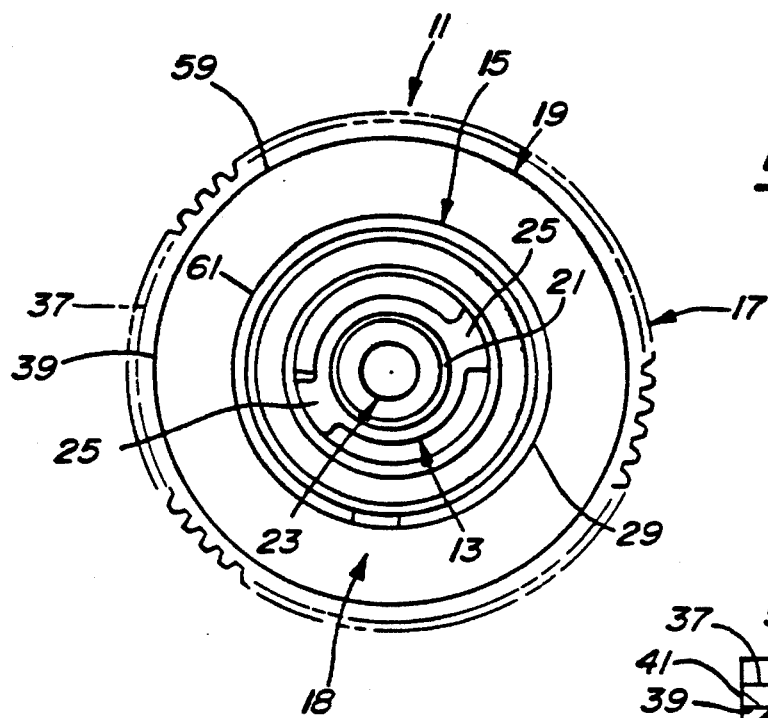
FIG. 3 is side elevational view, taken from FIG. 1 in the direction a of arrows 3—3 of the first preferred embodiment of the present invention gear.
Figure 4:
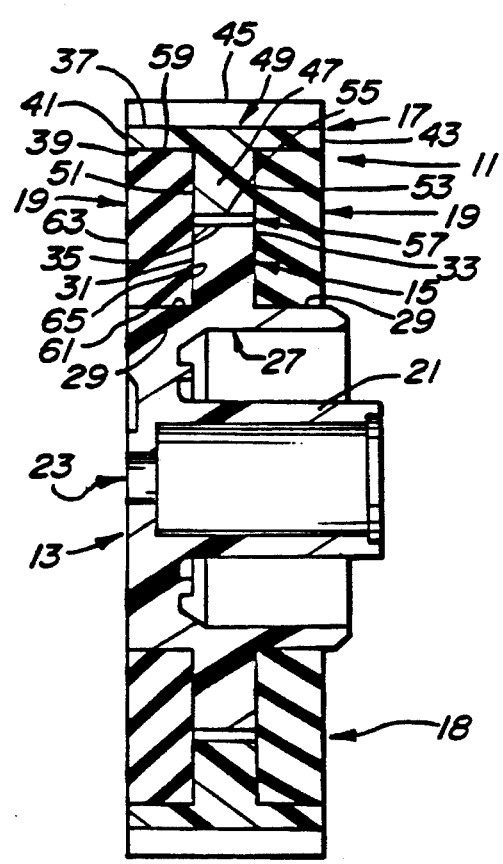
FIG. 4 is a cross-sectional view, taken along line 4—4 in FIG. 2, of the first preferred embodiment of the present invention gear.

The preferred embodiment of the stress dissipation gear of the present invention varies depending on the correct match between the application performance requirements of a set of geared teeth and the characteristics of a stress dissipating structure. For example, a first preferred embodiment of a stress dissipation gear 11 of the present invention for use in an automotive window lift motor application is shown in FIGS. 1–4. Gear 11 has a hub 13, a web 15, a gear-toothed radial rim 17, and a stress dissipating structure 18. Hub 13, also known as a central radial member, is centrally located adjacent to a rotational axis of the gear 11. A suitable power transmitting shaft 20 (see FIG. 8) is intended to be received within a collar 21 and an opening 23 within hub 13. Suitable means will be provided to rotationally couple shaft 20 to hub 13 such as, for example, a pair of wings 25, outwardly affixed to collar 21, which are intended to coact with means on the shaft to prevent relative rotation therebetween. Additional suitable locking means may be provided to prevent relative axial movement between shaft 20 and hub 13.

In this first embodiment, web 15 extends radially outward from a circumferential outer wall 29 of a transverse central portion 27 of hub 13. Web 15 consists of a pair of side wall surfaces 31 and 33 which terminate in an outside peripheral edge 35. For use in a window lift application, hub 13 and web 15 can be integrally injection molded from a suitable thermoplastic material wherein Delrin Acetel Homopolymer, a trademark of DuPont, has been found suitable. For an engine cam shaft application, hub 13 and web 15 can be molded from a composite of Phenolic resin filled with glass fibers or a mat.

Rim 17 has an outside rim surface 37 and an inside rim surface 39 joined by a pair of rim sides 41 and 43. A plurality of geared teeth 45, designed and manufactured by traditional methods as would be known to one skilled in the art, project radially outward from the outside rim surface 37. Rim 17 is also preferably injection molded from a suitable thermoplastic material similar to those used to produce hub 13 and web 15. However, either or both rim 17 and hub 13 may also be made of any other suitable material such as steel, a thermoset plastic, reinforced composites, and the like, which provide sufficient rigidity and strength for the drive torque necessitated by the application desired. An inner rib 47 extends radially inward from a transverse central portion 49 of inside rim surface 39. Inner rib 47 has a pair of side surfaces 51 and 53 which terminate at an inside radial rib edge 55. Inner rib 47 of rim 17 corresponds with and is aligned in the same plane as web 15 such that an inside radial rib edge 55 is adjacent and circumferentially parallel to outside peripheral edge 35 of web 15. A radial gap or clearance space 57 is located between inside radial rib edge 55 and outside peripheral edge 35. Preferably gap 57 will be relatively narrow so as to minimize radial displacement of rim 17 with respect to hub 13 yet sufficient to accommodate dimensional variations during manufacturing and to avoid or minimize frictional restraint on operational relative rotational movement between hub 13 and rim 17. It is presently believed that a gap in the thousandths of an inch range is preferable to meet these objectives and to ensure minimal radial compression and to allow for some independent relative rotation of rim 17 and hub 13 under high torsion stress conditions. As is illustrated in FIGS. 16 and 17, it is contemplated that suitable anti-friction means such as a ball bearing race 58 (FIG. 16) or a Teflon coating 60 (FIG. 17) may be optionally placed within gap 57 in-order to reduce frictional resistance between inside radial rib edge 55 and outside peripheral edge 35 of web 15. Teflon is a registered trademark of DuPont.

Referring again to FIGS. 1 through 4, stress dissipating structure 18 is comprised of a pair of resilient members 19 each having a disk-like shape. Each resilient member 19 has a circular configuration including a radially outer surface 59 and a radially inner surface 61, and is laterally flanked by a pair of side faces 63 and 65. Each resilient member 19 is preferably adhesive-bonded along its radially outer surface 59 to inside surface 39 of rim 17. Similarly, radially inner surface 61 of each resilient member 19 is preferably adhesive-bonded to circumferential outer wall 29 of hub 13. An adhesive primer known as Chemlok 45 and an adhesive known as Tyrite 7500 A/C, both of which are manufactured by Lord Corporation, have been found to be well suited for this application and have sufficient bonding strength. It should be noted that only the radially inner and outer peripheral surfaces, 59 and 61 respectively, are bonded to rim 17 and hub 13 respectively whereas the side faces 63 and 65 are free to move slightly with respect to the web 15 and rib 47. This insures that the stresses and associated shear forces are distributed over the entire radial width of members 19.

Figure 5:
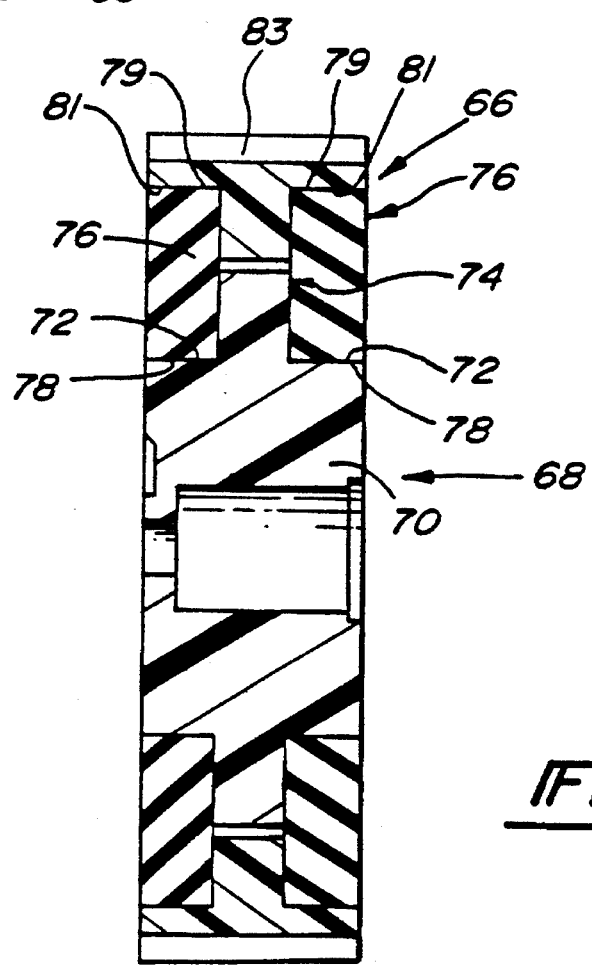
FIG. 5 is a cross-sectional view, similar to that shown in FIG. 4, of a second preferred embodiment of the present invention gear.

A second preferred embodiment of the present invention gear can be seen in FIG. 5. This gear 66 is similar to that of the previous preferred embodiment except that the hub 68 has no collar or wings. A shaft (not shown) is merely screwed into a flat central radial portion 70 which is circumferentially bordered by a peripheral hub shoulder 72. A web 74 radially extends outward therefrom. A pair of resilient members 76, similar to that of the first embodiment, have their radially inner surfaces 78 adhesively bonded to the peripheral hub shoulder 72 and radially outer surfaces 79 bonded to radially inwardly facing surfaces 81 of rim 83.

Alternatively, or in addition to the adhesive bonding of resilient members 19 or 76 to rim 17 and hub 13, a third preferred embodiment of a stress dissipation gear 130 of the present invention, shown in FIG. 8, provides a plurality of circumferentially spaced passageways 131 defined by inside surfaces extending through a web 133 and through an inner rib 135 of a rim 137. These passageways 131 substantially surround a gap 139 between web 133 and rim 137. Thus, during molding, a portion of a resilient member 138 will fill these passageways 131 and provide a mechanical attachment to replace and/or supplement the aforementioned adhesive bond. Preferably, the two annular arrays of passages 131 will be radially spaced apart as much as is reasonably possible in order to insure a substantial area of resilient material therebetween over which the shear forces resulting from the stress to which the gear is subjected to be disbursed.

A fourth preferred embodiment of a stress dissipation gear 136 of the present invention is disclosed in FIGS. 9 and 10. A stress dissipating resilient structure 140 is comprised of a first set of spokes 141 and a second set of spokes 143 both of which are separated by a web 144. Spokes 141 and 143 are integrally formed with and radially extend between a circumferential outer wall 145 of a hub 147 and an inner rim surface 149 of a rim 151. Furthermore, spokes 141 and 143 are radially rigid between rim 151 and hub 147 but are somewhat flexible in the direction of rotation of gear 11. Hollow cavities 152 and 154 are defined between each spoke 141 and 143 and an adjacent respective side wall surface 153 and 155, respectively, of web 144. A gap 159 between web 144 and an inner rib 161 extending from rim 151 is still present to allow some independent rotation of rim 151 to hub 147. Gear 136 is shown enmeshed with a portion of an automotive window lift mechanism 163.

A fifth preferred embodiment of a stress dissipation gear 169 of the present invention is shown in FIGS. 11 and 12. In this embodiment, stress dissipating resilient structure 171 is comprised of a first set of spokes 177, a second set of spokes 179, a first resilient member 181 and a second resilient member 183. Spokes 177 and 179 are substantially similar to that of the aforementioned fourth embodiment. However, a pair of resilient members 181 and 183 are located transversely outboard of a web 202 and a rib 204 extending from a rim 206 but a gap 208 is still free of any material. Thus, spokes 177 and 179 are substantially encapsulated within resilient members 181 and 183, respectively. Referring to FIG. 13, a sixth preferred embodiment of a stress dissipation gear 197 of the present invention is shown as incorporating the first and second sets of spokes 177 and 179, and the first and second resilient members 181 and 183 of the fifth preferred embodiment in combination with passageways 131 of the third preferred embodiment.

A significant advantage of the first through sixth embodiments of the present invention is that resilient member 19 is laterally supported by web 15 and inner rib 47 of the rim 17. See, for example, FIG. 4. This lateral support stops radial compression and substantially reduces angular torsional movement in a transverse direction of the rim 17 independent from the hub 13. For a particular application, the resilient members 19 are preferably made from the polymer Santoprene 101-55 which is an olefinic cross-linked thermoplastic elastomer manufactured by Advanced Elastomer Systems. Santoprene 101-55 has a Shore hardness value of 55. However, any natural or synthetic elastomer may be found suitable. It is important that the rigidity, modulus of elasticity, and thickness characteristics of the resilient member 19 be properly matched to the geared-tooth performance parameters so as to both limit excessive non-relative movement between the hub and gear while still offering sufficient stress dissipation to avoid excessive loading on either the gear teeth or the hub. Classical mechanics in combination with finite element analyses are available to achieve this purpose.

Figure 6:
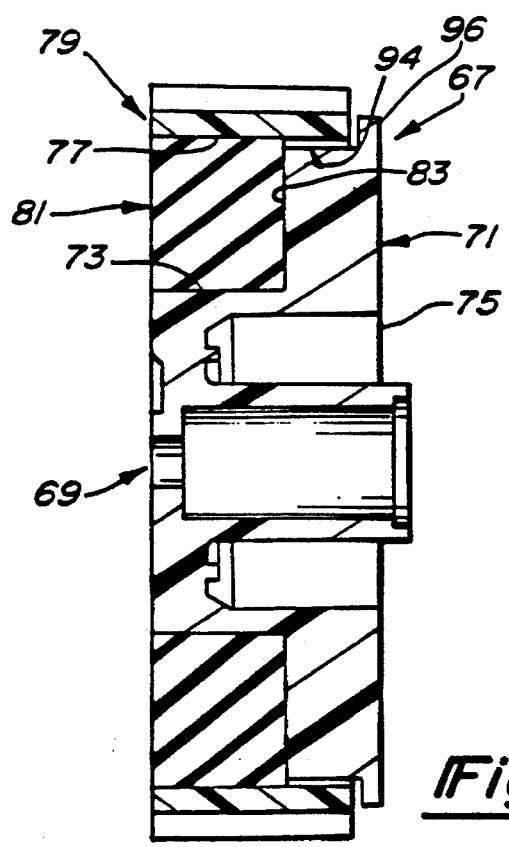
FIG. 6 is a cross-sectional view, similar to that shown in FIG. 4, of another preferred embodiment of the present invention gear.

In a seventh preferred embodiment, shown in FIG. 6, a stress dissipation gear 67 of the present invention has a hub 69 shaped similar to that of the first embodiment hub 13 of gear 11. However, with this seventh embodiment, web 71 is no longer centered upon circumferential outer wall 73 of hub 69, but is positioned at one extreme lateral edge 75 of hub 69. In such an embodiment web 71 radially extends outward to a corresponding position proximate to inside rim surface 77 and has radially outwardly facing surface 94 positioned in close proximity thereto. It should be noted that in this configuration rim 79 does not have an inner rib. A single resilient member 81 is located on a cavity side 83 of web 71 and is adhesively bonded to inside rim surface 77 and to circumferential outer wall 73 of hub 69. An advantage of this embodiment is that resilient member 81 may be substantially thicker in cross sectional width than that of the preceding embodiments. Furthermore, in this embodiment of gear 67 there is one less part to be manufactured and assembled thereby decreasing the overall cost of gear 67. Additionally, it should be noted that web 71 includes an integrally formed flange portion 96 projecting radially outwardly from surface 94 and in closely spaced laterally overlying relationship to the sidewall portion of rim 79. As such, flange 96 will serve to resist relative axial displacement of rim 79 to the right as shown with respect to hub 69 thus providing an added stabilizing influence between hub 69 and rim 79. It should also be noted that if desired radial spokes similar to spokes 177 may be incorporated in the embodiment of FIG. 6 in addition to or in lieu of resilient member 81.

Figure 7:
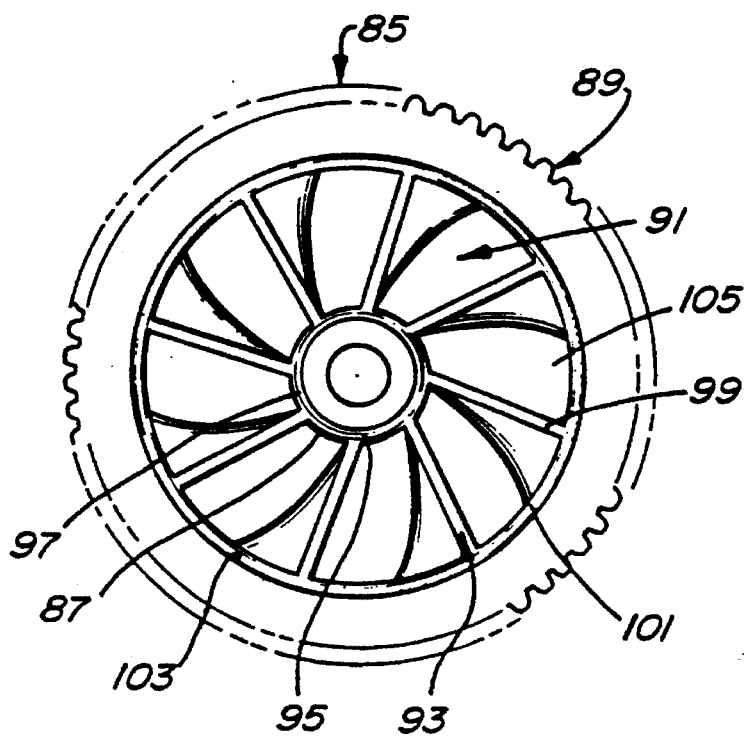
FIG. 7 is a side elevational view of yet another preferred embodiment of the present invention gear.

Turning to FIG. 7, an eighth preferred embodiment of the present invention stress dissipation gear 85 comprises a hub 87 of similar design to hub 69 of the preceding embodiment gear 67. Gear 85 further comprises a gear-toothed rim 89 which is substantially similar in configuration to rim 79 of the seventh embodiment gear 67. Gear 85 provides a unique stress dissipating structure 93 comprising a plurality of obliquely angled spokes 99. Stress dissipating structure 93 has an inner radial band 95 which peripherally surrounds the circumferential outer wall 97 of hub 87. Spokes 99 extend radially outward from the inner radial band 95 and join with an outer radial band 101 which internally borders an inside rim surface 103. A void 105 is created between each pair of spokes 99. Each spoke 99 is tilted from a transversely-facing orientation closest to outer radial band 95 to a rotational direction orientation closest to inner radial band 101. Spokes 99 are formed such that the resilient and flexible side is facing the direction of rotational movement of the gear. The spokes 99 take the form of fan blades and serve to couple rim 89 to hub 87. In this embodiment, hub 87 and gear-toothed rim 89 can be made from the same high modulus materials as the other embodiment hubs, webs, and rims such as steel, plastic, cast iron, bronze, composites, and the like. However, the resilient stress dissipating structure 93 is preferably made from spring steel or the like.

A ninth preferred embodiment of the present invention stress dissipation gear 599 is shown in FIG. 14. This gear 599 is comprised of a hub 601, a rim 603 and a stress dissipating structure 605. A web 607 radially projects outward from hub 601 and a rib 609 radially projects inward from rim 603 with a gap 623 created therebetween in a manner similar to that of the first preferred embodiment. Additionally, stress dissipating structure 605 provides a plurality of spokes 611 which are integrally formed with and couple rim 603 to hub 601. Furthermore, stress dissipating structure 605 provides a plurality of stops 613 juxtapositioned midway between each adjacent pair of spokes 611 and between rim 603 and hub 601. Each stop 613 has a substantially cylindrical radial configuration and is mounted upon an end of a stem 615 protruding from hub 601. In normal operation where overload, starting and stopping, and cyclical force fluctuations occur, rim 603 rotates relative to hub 601 while spokes 611 will flex over their entire length. During flexing, spokes 611 absorb energy and reduced the source stress effect on the outer teeth. Ideally, spokes 611 will be designed to maintain constant stress over their entire length and to maximize extensibility. As the relative movement continues, respective spokes 61 will move into engagement with respective stops 613 at which point stops 613 will provide a reinforcing effect restricting or resisting further flexing of the respective spokes 611. The degree or reinforcement provided by stops 613 can be easily controlled by controlling both the length of stem 615 and the rigidity or flexibility thereof. For example, placement of stop 613 in close proximity to the location along each spoke 611 where the greatest flexural movement is realized will provide the greatest anti-rotational resistance. Additionally, the relative spacing between respective spokes 611 and stops 613 enable the amount relative rotation between hub 601 and rim 613 to be controlled. Accordingly, each stop 613 incrementally urges a decrease and differential rotational movement between hub 601 and rim 603 by acting as a fulcrum against an adjacent spoke 611 during flexure thereagainst due to rotational torsion of gear 11. Thus, stop 613 acts to reduce the flexible moment arm of the adjacent spoke 611 when spoke 611 is in bent contact with the outer surface of the cylindrical section.

Referring to FIG. 15, a tenth preferred embodiment of a present invention stress dissipation gear 604 is shown as being similar to the ninth preferred embodiment, however, stress dissipating structure 605 further comprises a resilient elastomeric material 621 which is juxtapositioned between each pair of adjacent spokes 611 so as to substantially encapsulate each stop 613. Resilient elastomeric material 621 is further engaged with arrays of holes 625 in web 607 and inner rib 609 of rim 603. Nevertheless, gap 623 between web 607 and inner rib 609 is free of elastomeric material 621. In this embodiment spokes 611 will be prevented from engaging the stops, however, the stops will nevertheless provide increased resistance to the distortion of elastomeric material 621.

Figure 18:
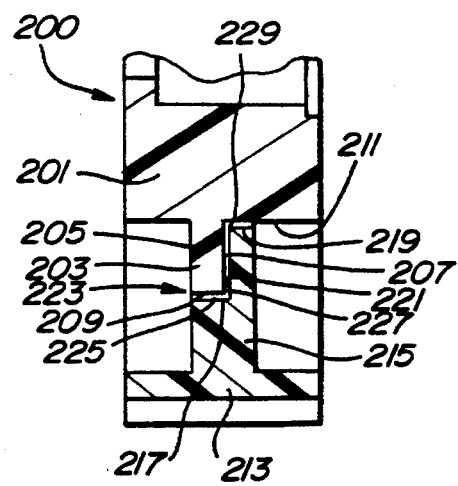
FIG. 18 is a fragmentary cross-sectional view, similar to that shown in FIG. 4, of another preferred embodiment of the present invention gear.
Figure 19:
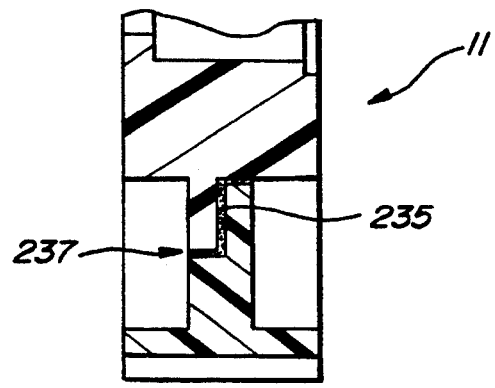
FIG. 19 is a fragmentary cross-sectional view, similar to that shown in FIG. 4, of an alternate embodiment used in combination with the preferred embodiment of the present invention gear of FIG. 18.
Figure 18A:
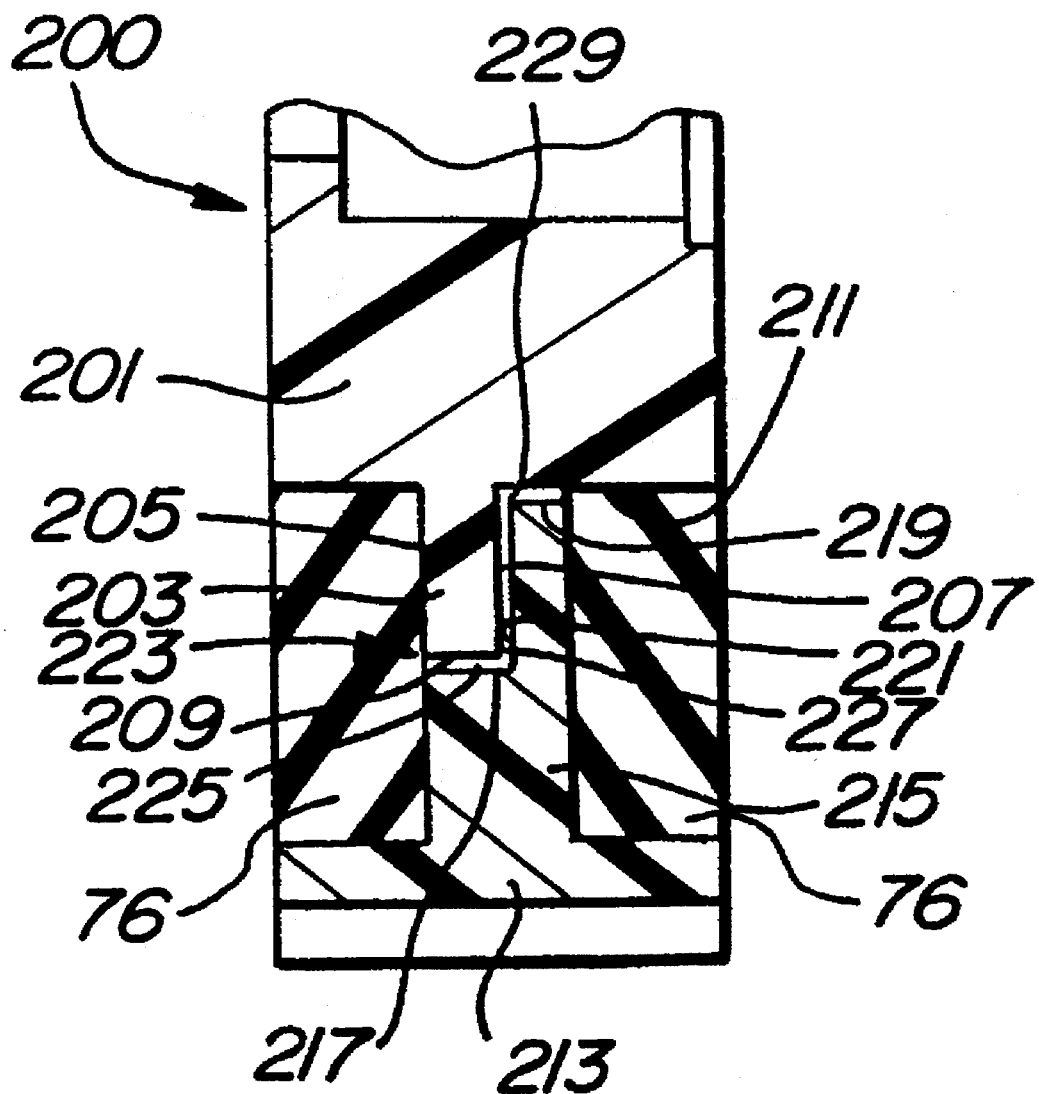

In many of the previous embodiments described above the hub and gear portions of each of the gears have been provided with radially extending axially aligned flange portions each having radially facing axially extending surfaces positioned in closely spaced relationship to aid in maintaining alignment of the axis of rotation of the rim and hub. The sidewalls of these flange portions also serve to provide resistance against relative transverse or axial displacement between the rim and hub by restricting axial deflection of the elastomeric material. However, in some applications it may be desirable to provide a structure offering increased resistance against such axial displacement. Such a construction is shown in FIGS. 18 and 19. In this eleventh preferred embodiment gear 200, a hub 201 has a circumferential outer wall 211 with a web 203 radially projecting therearound. Web 203 is comprised of a first side wall surface 205 and an opposite and parallel second side wall surface 207 both of which are bordered by an outside peripheral edge 209. A geared-tooth rim 213 has an inner rib 215 radially projecting inward therewithin in alignment with web 203. Inner rib 215 has a median ledge 217 and a distal ledge 219 joined by an intermediate radial section 221. An offset gap 223 has a first transverse leg 225 located between outside peripheral edge 209 of web 203 and median shelf 217 of rib 215. Gap 223 further has a radial leg 227 defined between second side wall surface 207 of web 203 and intermediate radial section 221 of rib 215. Also, gap 223 has a second transverse leg 229 radially offset from first transverse leg 225 defined between circumferential outer wall 211 of hub 201 and distal ledge 219 of rib 215. This construction will provide increased resistance to axial or lateral movement of hub 201 to the right (as shown) with respect to rim 213 due to the opposed radially extending surfaces provided by portions 203 and 205. A stress dissipating structure as shown in FIG. 18a, used to couple rim 213 to hub 201, can incorporate any of the aforementioned resilient members or spokes or a variety of anti-buckling plates which will be discussed hereinafter. It should be noted that the slight gap 223 insures that restricted relative circumferential movement between will be facilitated. If desired the opposed surfaces defining this gap may be provided with a suitable anti-friction means such as suitable bearings as maintained above with respect to FIG. 7 and/or a coating of a suitable lubricous material 235 such as is shown in gap 237 of FIG. 19.

Figure 20:
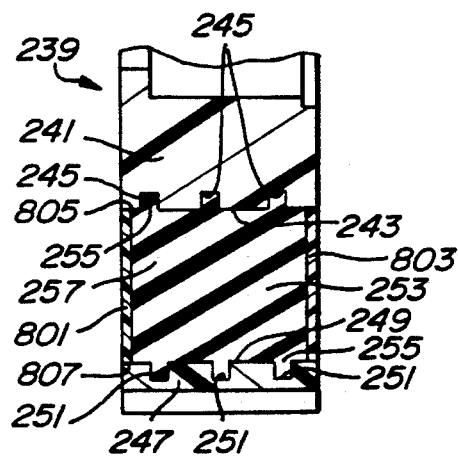
FIG. 20 a fragmentary cross-sectional view, similar to that shown in FIG. 4, of another preferred embodiment of the present invention gear.

A twelfth preferred embodiment of a stress dissipation gear 239 is shown in FIG. 20. A hub 241 has a circumferential outer wall 243 with a plurality of cylindrical recesses 245 therein. A gear-toothed rim 247 concentrically surrounds hub 241 and has an inside rim surface 249 with a plurality of cylindrically-shaped recesses 251 therein. A stress dissipating structure 253 is comprised of an elastomeric material juxtapositioned radially between hub 241 and rim 247. The elastomeric material of stress dissipating structure 253 has enhanced attachment characteristics since there are a plurality of projections 255 protruding from a body 257 which engagably interlock with recesses 245 and 251. Preferably projections 255 and recesses 245 and 251 will be in the form of an annular array, each array including a plurality of circumferentially spaced projections and corresponding recesses. In this embodiment, recesses 245 and 251 have a smaller relative transverse shape as compared to the remaining respective circumferential outer wall 243 and inside rim surface 249. Furthermore, a pair of anti-buckling plates 801 and 803 have a circular interior edge 805 and a circular exterior edge 807. Interior edge 805 of each anti-buckling plate 801 and 803 is joined to a circumferential outer wall 243 of a hub 241 in any suitable manner such as by sonic welding or an adhesive. Accordingly, exterior edge 807 of each anti-buckling plate 801 and 803 is clear of inside rim surface 249 of rim 247. Accordingly, rim 247 can rotate somewhat independently from anti-buckling plates 801 and 803. Alternatively, exterior edge 807 of each anti-buckling plate 801 and 803 can be joined to rim 247 while interior edge 805 is clear of hub 241.

Figure 21:
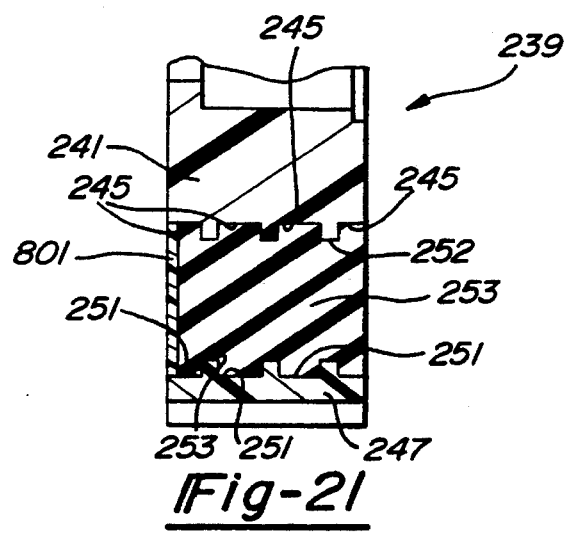
FIG. 21 is a fragmentary cross-sectional view, similar to that shown in FIG. 4, showing a modification of the preferred embodiment of the present invention gear of FIG. 20.

In contrast, FIG. 21 discloses an alternate embodiment on the twelfth preferred embodiment of the present invention stress dissipation gear 11. In FIG. 21, recesses 245 and 251 are replaced by a plurality of circumferentially and axially spaced projections 252 and 253. Also, only a single anti-buckling plate 801 is employed.

Figure 22:
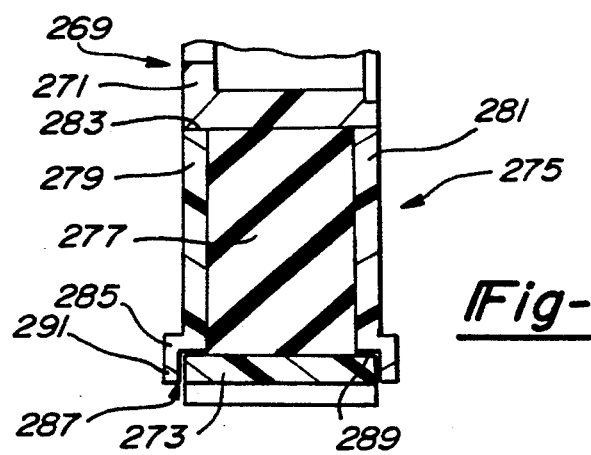
FIG. 22 is a fragmentary cross-sectional view, similar to that shown in FIG. 4, of another preferred embodiment of the present invention gear.

Referring to FIG. 22, a thirteenth preferred embodiment of a stress dissipation gear 269 of the present invention is constructed with a hub 271 and a rim 273 coupled by a stress dissipating structure 275. Stress dissipating structure 275 provides a resilient member 277, made from an elastomeric material, which couples hub 271 to rim 273. Stress dissipating structure 275 further provides a pair of antibuckling plates 279 and 281 which are disposed on either transverse side of resilient member 277. An interior edge 283 of each anti-buckling plate 279 and 281 is joined to hub 271 by sonic welding or adhesive while an offset distal end 285 of each anti-buckling plate 279 and 281 is proximate with rim 273 but spatially disposed away therefrom such that a gap 287 is created. Offset distal end 285 has a ledge 289 and an offset wall 291 which transversely support rim 273 against axial torsion in relation to hub 271. Of course, anti-buckling plates 279 and 281 can be oppositely constructed so as to be affixed to rim 273 and to have clearance to hub 271. Similarly, recesses and projections, such as those disclosed in the twelfth preferred embodiment, can be incorporated into the present embodiment.

A fourteenth preferred embodiment of a present invention stress dissipation gear 299, illustrated in FIG. 23, has a hub 301, a radial rim 303 and a stress dissipating structure 305. Hub 301 has a circumferential outer wall 307 surrounding a central rotational axis 309. Rim 303 has a plurality of geared teeth 311 outwardly projecting therefrom and has an inside rim surface 313 coaxial with hub 301. Stress dissipating structure 305 is constructed with a first set of formations 315 attached to or integrally formed with circumferential outer wall 307 of hub 301. Stress dissipating structure 305 further provides a second set of formations 317 which project from inside rim surface 313. First and second sets of formations, respectively, 315 and 317, are preferably cylindrical in shape and have a hollow internal cavity 319. However, these formations 315 and 317 may alternatively have a triangular, rectangular or other polygonal or curved shape with or without hollow internal cavities. Further, these formations may be somewhat resiliently deformable or relatively rigid depending upon the intended application. Stress dissipating structure 305 may also include an elastomeric material 321 which couples rim 303 to hub 301. The combination of the first and second sets of formations 315 and 317, respectively, and elastomeric material 321 achieve a multi-staged torsional variance reducing structure. The spacing between formations 315 and 317 allows rim 303 to rotate somewhat independently from hub 301 in order to dissipate the stresses therebetween until formations 315 contact and then possibly resiliently deform formations 317 thereby encouraging a reduction in this differential rotational movement. The rate of independent movement or dissipation of stress can be varied through different spacing between formations 315 and 317, the axial width thereof (i.e., the degree of relative axial overlap designed), by modifying the shapes and thickness of formations 315 and 317, and by changing the stiffness of elastomeric material 321. One or more anti-buckling plates, such as that shown in the following embodiment, are preferably incorporated within gear 299.

A fifteenth preferred embodiment of a stress dissipation gear 233 of the present invention is substantially similar to that of the fourteenth preferred embodiment. This embodiment can be observed in FIG. 24. Nevertheless, this fifteenth exemplary embodiment provides for relatively smaller diameter rotatably deformable formations 337 and 339, and at least one anti-buckling plate 331 between a rim 333 and a hub 335. Anti-buckling plate 331 is preferably affixed to hub 335 and has clearance to rim 333 while being disposed transversely adjacent to the first set of rotatably deformable formations 337, the second set of rotatably deformable formations 339 and an elastomeric material 341.

Referring to FIG. 25, a sixteenth preferred embodiment of a present invention stress dissipation gear 349 is comprised of a hub 351, a rim 353 and a stress dissipating structure 355. Stress dissipating structure 335 includes a plurality of integrally formed spokes 357 which radially extend from hub 351 to rim 353. Spokes 357 are radially rigid but are somewhat flexible in the direction of rotation. Alternately, stress dissipating structure 355 further provides a pair of anti-buckling plates 359 juxtaposed radially between hub 351 and rim 353 on opposite axial sides. Anti-buckling plates 359 are attached to hub 351 and are used to add radial rigidity and to help prevent lateral twisting of rim 353 in relation to hub 351. Moreover, elastomeric material (not shown) could also fill a void created between the pair of anti-buckling plates 359.

Figure 26:
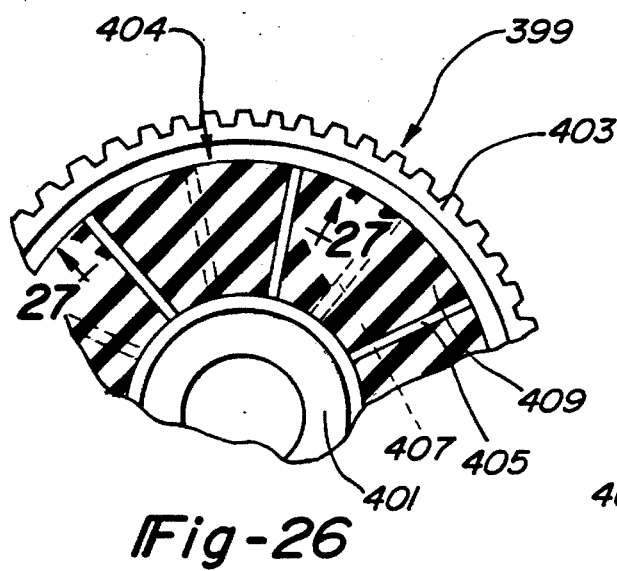
FIG. 26 is a fragmentary diametral sectional view of another preferred embodiment of the present invention gear.
Figure 27:
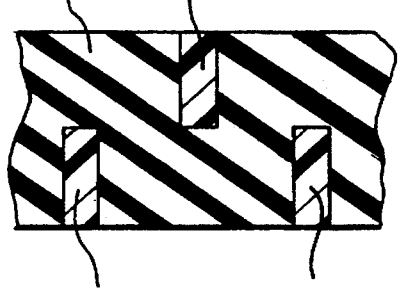
FIG. 27 is a fragmentary cross-sectional view of the gear of the present invention, taken along line 27—27 of FIG. 26.

A seventeenth preferred embodiment of the present invention stress dissipation gear 399 can be observed in FIGS. 26 and 27. This gear is comprised of a hub 401 and a rim 403 joined by a stress dissipating structure 404 comprised of a first series of spokes 405, a second series of spokes 407 and an elastomeric material 409. First series of spokes 405 are in a first radial plane while second series of spokes 407 are in a second radial plane transversely offset from first series of spokes 405. Furthermore, first and second series of spokes, respectively 405 and 407, are alternately staggered in relation to each other. As with previous embodiments, spokes 405 and 407 are radially rigid while being somewhat flexible in a rotational direction. These staggered spokes 405 and 407 also serve to lock elastomeric material 409 in place so that adhesive bonding may not be required. Of course, an anti-buckling plate (not shown) can be used in combination with this embodiment.

Figure 28:
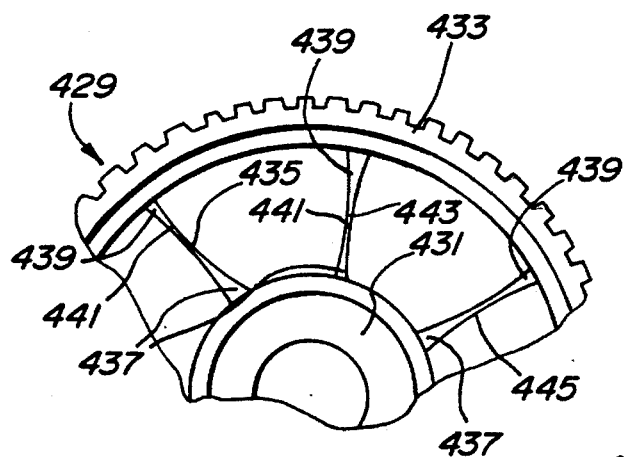
FIG. 28 is a fragmentary side elevational view of a further preferred embodiment of the present invention gear.

FIG. 28 illustrates an eighteenth preferred embodiment of a stress dissipation gear 429 of the present invention. A hub 431 and a rim 433 are joined by a plurality of radially extending spokes 435. Each spoke 435 has a proximal end 437 and a distal end 439 joined by a median segment 441. Spokes 435 are alternately disposed such that a first exemplary spoke 443 has a slightly expanded proximal end 437 and an enlarged distal end 439 and a constricted median segment 441 with the cross sectional size of enlarged distal end 439 being greater than that of proximal end 437. This configuration is inverted for an adjacent spoke 445 wherein distal end 439 is slightly expanded while proximal end 437 is relatively larger in expansion. This provides for a radial incremental reduction and then increase in rotational flexibility and rigidity based on the specific cross sectional area. Additionally, although not shown, an anti-buckling plate or elastomeric material can be used in combination with these spokes.

Figure 29:
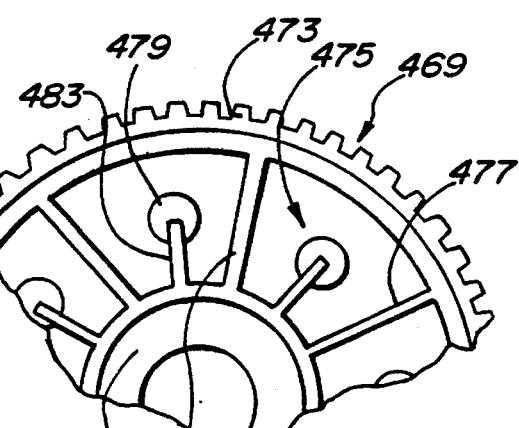
FIG. 29 is a fragmentary side elevational view of yet another preferred embodiment of the present invention gear.
Figure 30:
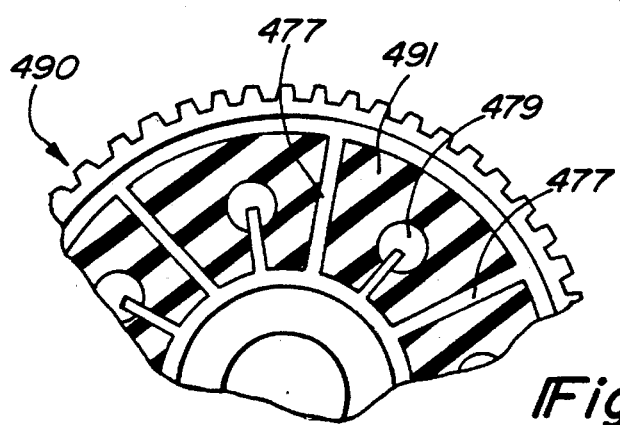
FIG. 30 is a fragmentary diametral sectional view of a further preferred embodiment of the present invention gear.

A nineteenth preferred embodiment of a present invention stress dissipation gear 469 shown in FIG. 29, provides a hub 471, a rim 473 and a stress dissipating structure 475. Stress dissipating structure 475 is comprised of a plurality of spokes 477 which radially extend between hub 471 and rim 473, and a plurality of stops 479 which project in a radially outward manner from hub 471. Each stop 479 is disposed midway between hub 471 and rim 473 and is juxtapositioned between each adjacent pair of spokes 477. In this embodiment, each stop 479 has a radially cylindrical configuration suspended from an end of a stem 483. Stops 479 may also serve as anti-buckling members. FIG. 30 shows a twentieth preferred embodiment of a stress dissipation gear 490 of the present invention. This exemplary embodiment is substantially similar to that of the nineteenth preferred embodiment, however, an elastomeric material 491 is positioned between each adjacent spoke 477 so as to surround each stop 479. Of course, anti-buckling plates, such as those used in the twelfth and thirteenth embodiments, can be incorporated into the nineteenth and twentieth embodiments.

Figure 31:
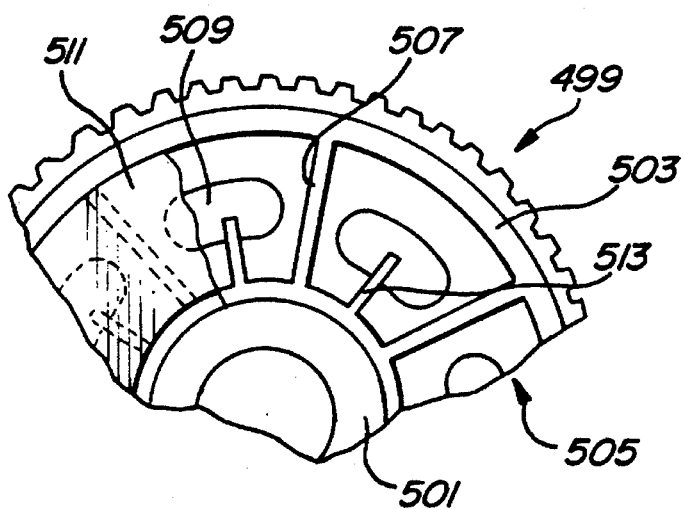
FIG. 31 is a fragmentary side elevational view of another preferred embodiment of the present invention gear.

A twenty-first preferred embodiment of a present invention stress dissipation gear 499 can be seen in FIG. 31. Gear 11 is comprised of a hub 501 and a rim 503 joined by a stress dissipating structure 505. Stress dissipating structure 505 is defined by a plurality of radial spokes 507, a plurality of stops 509 and a pair of transversely external anti-buckling plates 511. In this embodiment, each stop 509 has an elongated arcuate transverse configuration mounted on a stem 5 13. Moreover, stop 509 can be given a variety of shapes so as to specifically control the amount independent rotation of rim 503 in relation to hub 501 depending on the specific application.

Figure 32:
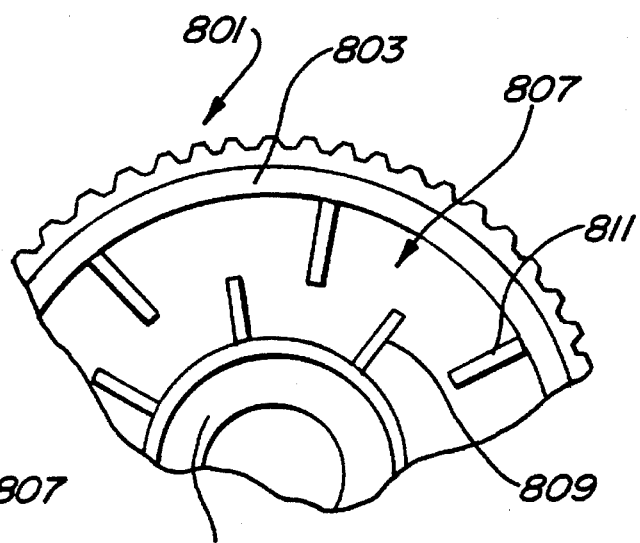
FIG. 32 is a fragmentary side elevational view of still another preferred embodiment of the present invention gear.
Figure 33:
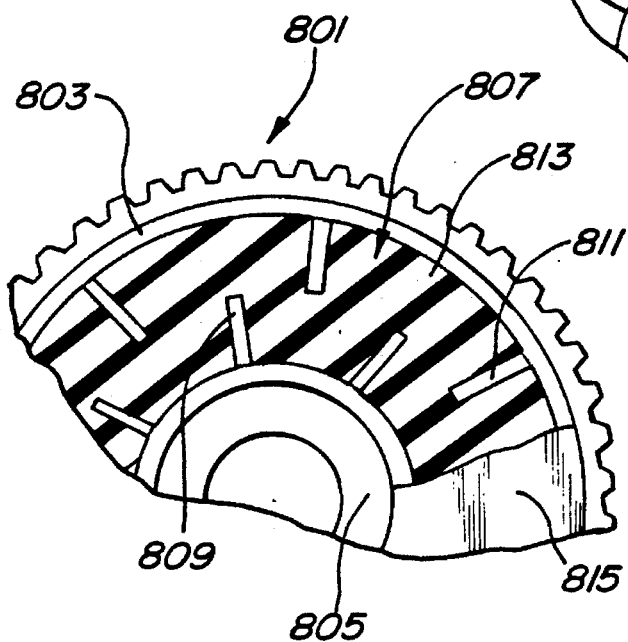
FIG. 33 is a fragmentary diametral view, partially in section, of the preferred embodiment of the present invention gear of FIG. 32 after an elastomeric material is added.

Referring to FIGS. 32 and 33, a twenty-third preferred embodiment of a present invention stress dissipation gear 801 is comprised of a gear-toothed rim 803, a hub 805 and a stress dissipating structure 807. Stress dissipating structure 807 is defined by a plurality of outwardly radiating rotatably deformable shaft formations 809 and a plurality of inwardly radiating rotatably deformable shaft formations 811 which flexibly interfere with each other upon differential rotational movement between rim 803 and hub 805. As can be observed in FIG. 33, stress dissipating structure 807 further includes an elastomeric material 813 and at least one anti-buckling plate 815.

Many of the gears of the present invention, such as gear 11 for example, can be cost effectively produced through a multi-step injection molding process. Referring to the first preferred embodiment shown in FIGS. 1 through 4, the hub 13, web 15 and rim 17 are first injection molded within a precut tool cavity (not shown). The radial gap 57 between the web 15 and the rim 17 is created by protruding tool metal, thus, the minimum gap dimension is dictated by normal tooling maintenance requirements. A few thin bridges (not shown) may need to be molded between the rim 17 and the web 15 so that this first step molding can be readily transferred to a second station (after which any such connecting bridges would be removed). In the second station, an adhesive coating will be applied to the inside surface 39 of the rim 17 and to the outside surface of the circumferential outer wall 29. Lastly, the synthetic elastomeric material is injection molded in place over the hub 13, web 15 and rim 17. A release agent may need to be added to preselected areas of web 15 and rib 47 such that the elastomeric material will not bond to these areas. The release agent also provides a lubricous action against the elastomeric material. With respect to the eighth preferred embodiment stress dissipation gear 85 illustrated in FIG. 7, the stress dissipating structure 93 may be manufactured by powdered metal molding, casting, brazing, milling or other processes. Alternatively, hub 13, web 15, rib 47 and rim 17 may be independently molded and assembled together prior to overmolding of the elastomeric material in order to minimize radial gaps 57.

It will be appreciated that the present invention represents a significant quality improvement by reducing internal gear stresses. Due to start-up shocks, shutdown shocks, overload, and cyclical fatigue the stress dissipating structure absorbs and dissipates many of the stresses created between the hub and the gear-toothed rim such that the hub and the rim are allowed to temporarily rotate to a pre-designed degree independent from one another. The present invention is also advantageous over conventional gears since the present invention stress dissipation gear is easily "tunable" or adjustable by modifying the shapes or materials used in creating the stress dissipating structure. Furthermore, the process by which the gear of the present invention can be produced is very cost-effective and accurate.

While a number specific embodiments of this gear and the process to make such have been disclosed, it will be appreciated that various modifications may be made without departing from the present invention. While a spur gear has been depicted and described, it will be appreciated that a similar construction and process can be applied to other types of gears. For example, a pinion gear, a worm gear, a chain drive sprocket, a belt drive pulley or other power transferring means may be integrally molded to an anti-buckling plate or other portion of the stress dissipation gear of the present invention. Furthermore, while various materials have been disclosed in an exemplary fashion, various other materials may of course be employed as long as the teeth and hub regions have sufficient rigidity and strength to provide the drive torque required by the desired application. It is intended by the following claims to cover these and any other departures from these disclosed embodiments which fall within the true spirit of this invention.

The invention claimed is:

1. A gear comprising:

a central radial member having a central rotational axis therein;

a radial rim sharing said central rotational axis and having geared-teeth extending outwardly therefrom, said rim further having an inside rim surface thereof;

a pair of side wall surfaces radially extending normal to said central rotational axis of said central radial member, said pair of side wall surfaces bordered by an outside peripheral edge concentric with said central rotational axis, said pair of side wall surfaces located radially between said central radial member and said radial rim; and a stress dissipating structure coupling said radial rim to said central radial member, said stress dissipating structure being clear of a clearance space created between said outside peripheral edge and said radial rim, said stress dissipating structure further dissipating stresses created between said central radial member and said radial rim.

2. The gear of claim 1 wherein said central radial member includes a hub having a circumferential outer wall with an opening centrally located therewithin such that a power generating device can be affixed thereto for axially rotating said gear, said side wall surfaces extending from said central radial member and defining a web.

3. The gear of claim 2 further comprising:

a centrally located rib extending radially inward from said inside rim surface, said rib being in substantially planar alignment with said web, said gap defined between an inside radial edge of said rib and said outside peripheral edge of said web.

4. The gear of claim 3 wherein said stress dissipating structure includes a resilient member having a portion thereof with a radial disk-like shape, said resilient member further having a pair of side faces thereof bordered by a radially outer surface and a radially inner surface.

5. The gear of claim 4 wherein:

said web is located substantially central in a transverse direction upon said hub; and said resilient member is attached proximate to a first of said center side wall surfaces.

6. The gear of claim 5 wherein said stress dissipating structure includes a second resilient member attached proximate to a second of said center side wall surfaces.

7. The gear of claim 4 wherein:

said web is transversely offset toward a lateral side of said hub portion; and said resilient member substantially fills a radial cavity created between said circumferential outer wall of said hub, said inside rim surface and one of said side wall surfaces of said web.

8. The gear of claim 1 wherein said stress dissipating structure includes a resilient member having a portion thereof with a radial disk-like shape, said resilient member further having a pair of side faces thereof bordered by a radially outer surface and a radially inner surface.

9. The gear of claim 8 wherein said resilient member is comprised of a synthetic elastomeric polymer.

10. The gear of claim 8 wherein said resilient member is comprised of a natural rubber compound.

11. The gear of claim 4 wherein said radially outer surface of said resilient member is adhesively bonded to said inside rim surface and said radially inner surface of said resilient member is adhesively bonded to said circumferential outer wall of said hub.

12. The gear of claim 4 wherein:

said web has a plurality of inside surfaces extending therein defining a plurality of passageways therethrough;

said rib of said radial rim has a plurality of inside surfaces extending therein defining a plurality of passageways therethrough; and said resilient member is coupled to said hub and said rim by having portions of said resilient member securely engaged within said plurality of passageways through said web and said rib.

13. The gear of claim 2 wherein said stress dissipating structure further includes:

a first set of spokes radially projecting from said hub to said inside rim surface, said first set of spokes juxtapositioned transversely adjacent to said web, said first set of spokes being somewhat flexible in said direction of rotation.

14. The gear of claim 13 wherein said stress dissipating structure further includes:

an elastomeric material juxtapositioned between said first set of spokes and said web.

15. The gear of claim 13 wherein said stress dissipating structure further includes:

an elastomeric material juxtapositioned between each adjacent pair of said first set of spokes.

16. The gear of claim 15 wherein said elastomeric material substantially encapsulates said first set of spokes therein.

17. The gear of claim 13 wherein said stress dissipating structure further includes:

a second set of spokes radially projecting from said hub to said inside rim surface, said second set of spokes juxtapositioned transversely adjacent to said web on a side of said web transversely opposite from said first set of spokes, said second set of spokes being somewhat flexible in said direction of rotation.

18. The gear of claim 13 wherein said stress dissipating structure further includes:

a stop located between each adjacent pair of said first set of spokes so as to incrementally urge a decrease in differential rotational movement between said rim and said hub coupled therewith.

19. The gear of claim 18 wherein said stress dissipating structure further includes:

a stem coupling said stop to said hub such that said stop is radially located substantially midway between said hub and said rim thereabout and substantially midway between said adjacent pair of said first set of spokes thereabout.

20. The gear of claim 18 wherein said stop has a substantially cylindrical radial shape thereof.

21. The gear of claim 18 wherein said stop has an elongated arcuate radial configuration thereof.

22. The gear of claim 18 wherein said stop acts as a fulcrum when an adjacent one of said first set of spokes is in contact therewith.

23. The gear of claim 3 wherein:

said rib of said rim includes a median ledge, an intermediate radial section and a distal ledge thereof;

said median ledge of said rib opposes said outside peripheral edge of said web thereby defining a first transverse leg of a gap therebetween;

said intermediate radial section of said rib opposes one of said pair of side wall surfaces of said web thereby defining a radial leg of said gap therebetween; and said distal ledge of said rib opposes said circumferential outer wall of said hub thereby defining a second transverse leg of said gap therebetween, said second transverse leg is radially offset from said first transverse leg therenear.

24. The gear of claim 1 wherein said pair of sidewall surfaces define:

a substantially rigid anti-buckling plate having an annular configuration thereto with a portion thereof juxtapositioned between said central radial member and said rim.

25. The gear of claim 24 wherein said anti-buckling plate has a first portion thereof affixed to said central radial member and a second portion thereof proximate with said rim but freely rotatably in relation thereto.

26. The gear of claim 24 wherein said anti-buckling plate has a first portion thereof affixed to said rim and has a second portion thereof proximate with said central radial member but freely rotatable in relation thereto.

27. The gear of claim 24 further comprising:

a second substantially rigid anti-buckling plate having an annular configuration thereto with a portion thereof radially juxtapositioned between said central radial member and said rim, said second anti-buckling plate transversely disposed in spaced relationship parallel to said first anti-buckling plate.

28. The gear of claim 8 wherein said resilient member is coupled to said rim and said central radial member by attachment of said radially outer surface of said resilient member to said inside rim surface and attachment of said radially inner surface of said resilient member to a portion of said central radial member other than to said outside peripheral edge extending therefrom.

29. The gear of claim 1 wherein said stress dissipating structure is separately assembled to said rim and said central radial member, said stress dissipating structure includes:

an inner radial band adapted to be affixed to said circumferential outer wall and an outer radial band affixed to said inside rim surface; and a central spoked portion comprising a plurality of spokes with voids therebetween, said plurality of spokes extending radially outward from said inner radial band to said outer radial band, said plurality of spokes being resilient in said direction of rotation.

30. The gear of claim 29 wherein said central spoked portion is spring steel.

31. The gear of claim 1 wherein a ball bearing race is located in said gap.

32. The gear of claim 1 wherein friction-reducing material is located in said gap.

33. A stress dissipation gear comprising:

a central radial member having a central rotational axis therein with a pair of side wall surfaces radially extending outward therefrom and being bordered by an outside peripheral edge to form a web portion, said side wall surfaces being generally planar, said central radial member operable for being rotated about its central rotational axis by a power generating means;

a radial rim member having the same central rotational axis as said central radial member, said radial rim member having geared-teeth extending outwardly therefrom, said radial rim member further having an inside rim surface being radially planar in attitude, said inside rim surface being predominately of greater diametral circumference than the diametral circumference of said outside peripheral edge of said central radial member; and a resilient member being of a radial disk-like shape with a pair of generally planar side faces thereof bordered by a radially outer surface and a radially inner surface, said resilient member being attached to said radial rim member and said central radial member by attachment of said radially outer surface of said resilient member to said inside rim surface and attachment of said radially inner surface of said resilient member to a portion of said central radial member other than to said outside peripheral edge thereof, said resilient member being clear of a clearance space created between said outside peripheral edge of said central radial member and said radial rim member.

34. A gear comprising:

a hub having a circumferential outer wall thereabout surrounding a central rotational axis therein;

a radial rim coaxially coupled with said hub, said rim having geared teeth extending outwardly therefrom and having an inside rim surface;

means for coupling said hub and rim together;

a first set of rotatably deformable formations attached to said circumferential outer wall of said hub;

a second set of rotatably deformable formations projecting from said inside rim surface; and said first and second sets of rotatably deformable formations allowing said rim to rotate somewhat independently from said hub while dissipating stresses therebetween and encouraging a differential reduction in rotational movement between said rim and said hub coupled thereto.

35. The gear of claim 34 wherein:

said first set of rotatably deformable members have a cylindrical configuration thereto with an outside surface thereof attached to said circumferential outer wall of said hub thereagainst;

said second set of rotatably deformable members having a cylindrical configuration thereto with an outside surface thereof attached to said inside rim surface thereagainst; and each of said first and second sets of rotatably deformable members are alternately disposed adjacent to the other such that upon differential rotation of said rim to said hub, said first and said second sets of rotatably deformable members will resiliently interfere with one another.

36. The gear of claim 34 wherein said coupling means includes:

an elastomeric material disposed between said hub and said rim.

37. The gear of claim 34 further comprising:

an elastomeric material disposed internally within each member of said first and second sets of rotatably deformable members.

38. The gear of claim 34 wherein:

said first set of rotatably deformable members have a substantially straight configuration thereto outwardly radiating from said circumferential outer wall of said hub.

39. The gear of claim 34 wherein:

said second set of rotatably deformable members have a substantially straight configuration thereto inwardly radiating from said inside rim surface.

40. A gear comprising:

a hub having a circumferential outer wall thereabout surrounding a central rotational axis therein;

a radial rim coaxially coupled with said hub, said rim having geared teeth extending outwardly therefrom and having an inside rim surface;

an elastomeric material disposed between said hub and said rim for coupling said hub and rim together;

a first set of rotatably deformable formations attached to said circumferential outer wall of said hub, said first set of rotatably deformable members having a cylindrical configuration thereto with an outside surface thereof attached to said circumferential outer wall of said hub thereagainst;

a second set of rotatably deformable formations projecting from said inside rim surface, said second set of rotatably deformable members having a cylindrical configuration thereto with an outside surface thereof attached to said inside rim surface thereagainst; and said first and second sets of rotatably deformable formations allowing said rim to rotate somewhat independently from said hub while dissipating stresses therebetween and encouraging a differential reduction in rotational movement between said rim and said hub coupled thereto, each of said first and second sets of rotatably deformable members being alternately disposed adjacent to the other such that upon differential rotation of said rim to said hub, said first and said second sets of rotatably deformable members will resiliently interfere with one another.

41. A gear comprising:

a hub having a circumferential outer wall with a central portion therein operably engagable with a power generating device for supplying axial rotation thereto, said circumferential wall having a plurality of recesses inwardly extending in a radial manner therewithin;

a radial rim coaxially surrounding said hub, said radial rim having geared teeth extending outwardly therefrom, said radial rim further having an inside rim surface with a plurality of recesses radially extending outward therefrom; and an elastomeric material having a body thereof with a first plurality of projections extending therefrom interlockably attached to said circumferential outer wall of said hub and said plurality of recesses therewithin, said body of said resilient member further having a second plurality of projections extending therefrom interlockably attached to said inside rim surface and said plurality of recesses therewithin;

whereby said resilient member couples said radial rim to said hub thereby allowing said geared teeth of said radial rim to transmit power to a mating part engaged therewith, said elastomeric material dissipating torsional stresses created between said hub and said radial rim.

42. The gear of claim 41 further comprising:

a substantially rigid anti-buckling plate having an annular configuration thereto with a portion thereof juxtapositioned between said hub and said rim.

43. The gear of claim 42 wherein said anti-buckling plate has a first portion thereof affixed to said hub and a second portion thereof proximate with said rim but freely rotatably in relation thereto.

44. The gear of claim 42 wherein said anti-buckling plate has a first portion thereof affixed to said rim and has a second portion thereof proximate with said hub but freely rotatable in relation thereto.

45. The gear of claim 42 further comprising:

a second substantially rigid anti-buckling plate having an annular configuration thereto with a portion thereof radially juxtapositioned between said hub and said rim, said second anti-buckling plate transversely disposed in spaced relationship parallel to said first anti-buckling plate.

46. The gear of claim 41 wherein said mating part includes an automotive window lift mechanism.

47. A gear comprising:

a hub having a central rotational axis and a circumferential outer wall therearound, a pair of sidewall surfaces radially extending normal to said central rotational axis thereby defining a web therebetween, said pair of sidewall surfaces bordered by an outside peripheral edge;

a radial rim sharing said central rotational axis and having geared teeth extending outwardly therefrom, said rim further having an inside rim surface with a rib radially projecting inward therefrom, said rib of said rim further including a median ledge, an intermediate radial section and a distal ledge thereof;

said median ledge of said rib opposing said outside peripheral edge of said web thereby defining a first transverse leg of a gap therebetween;

said intermediate radial section of said rib opposing one of said pair of side wall surfaces of said web thereby defining a radial leg of said gap therebetween; and said distal ledge of said rib opposing said circumferential outer wall of said hub thereby defining a second transverse leg of said gap therebetween, said second transverse leg radially offset from said first transverse leg therenear.

48. The gear of claim 47 further comprising:

an elastomeric material coupling said hub to said rim.

49. A gear comprising:

a hub having a central rotational axis and a circumferential outer wall therearound;

a radial rim sharing said central rotational axis and having geared teeth extending outwardly therefrom, said rim further having an inside rim surface thereof;

a set of spokes radially extending between said hub and said rim, said set of spokes being substantially rigid in a radial direction and substantially flexible in a direction of rotation; and an elastomeric material juxtapositioned between said hub and said rim and also located between an adjacent pair of said set of spokes.

50. The gear of claim 49 wherein said stress dissipating means includes:

a stop located between said adjacent pair of said set of spokes so as to incrementally urge a decrease in differential rotational movement between said rim and said hub coupled therewith; and said stop acting as a fulcrum when an adjacent one of said set of spokes is in contact therewith.

51. A gear comprising:

a hub having a central rotational axis and a circumferential outer wall therearound;

a radial rim sharing said central rotational axis and having geared teeth extending outwardly therefrom, said rim further having an inside rim surface thereof;

a substantially rigid anti-buckling plate having an annular configuration thereto with a portion thereof juxtapositioned between said central radial member and said rim; and a set of spokes radially extending between said hub and said rim, said set of spokes being substantially rigid in a radial direction and substantially flexible in a direction of rotation.

52. The gear of claim 51 further comprising:

a second substantially rigid anti-buckling plate having an annular configuration thereto with a portion thereof radially juxtapositioned between said central radial member and said rim, said second anti-buckling plate transversely disposed in spaced relationship parallel to said first anti-buckling plate.

53. The gear of claim 51 further comprising:

an elastomeric material juxtapositioned between each adjacent pair of said set of spokes.

54. A gear comprising:

a hub having a central rotational axis and a circumferential outer wall therearound;

a radial rim sharing said central rotational axis and having geared teeth extending outwardly therefrom, said rim further having an inside rim surface thereof;

a set of spokes radially extending between said hub and said rim, said set of spokes being substantially rigid in a radial direction and substantially flexible in a direction of rotation, each of said set of spokes having a proximal end and a distal end joined by a median segment, each of said set of spokes having a first and a second type of spoke alternately disposed;

said first type of spoke defined by an expanded proximal end along said direction of rotation and said median segment constricted relatively narrower than both said proximal and distal ends thereof; and a second type of spoke defined by an expanded distal end along said direction of rotation and said median segment constricted relatively narrower than both said distal and proximal ends thereof.

55. The gear of claim 54 further comprising:

an elastomeric material juxtapositioned between each adjacent pair of said set of spokes.

56. A gear comprising:

a hub having a central rotational axis and a circumferential outer wall therearound;

a radial rim sharing said central rotational axis and having geared teeth extending outwardly therefrom, said rim further having an inside rim surface thereof;

a first set of spokes radially projecting from said circumferential outer wall of said hub to said inside rim surface, said first set of spokes being substantially rigid in a radial direction and being somewhat flexible in a direction of rotation; and a second set of spokes radially projecting from said circumferential outer wall of said hub to said inside rim surface, said second set of spokes being substantially rigid in a radial direction and being somewhat flexible in a direction of rotation, said second set of spokes juxtapositioned transversely adjacent and circumferentially staggered in relation to said first set of spokes.

57. The gear of claim 56 further comprising:

an elastomeric material juxtapositioned between said hub and said rim.

* * * * *

UNITED STATES PATENT AND TRADEMARK OFFICE
CERTIFICATE OF CORRECTION

PATENT NO. : 5,452,622
DATED : September 26, 1995
INVENTOR(S) : Paul J. Fenelon

It is certified that error appears in the above-indentified patent and that said Letters Patent is hereby corrected as shown below:

On the Title Page under Attorney, Agent, or Firm

"Harness, Dickey & Pierce" should be -- Harness, Dickey & Pierce, P.L.C. --;

Column 3, line 37, (application page 6, line 11);
delete "a".

Column 4, between lines 18 and 19
after line 22;
insert -- Figure 18a is a fragmentary cross sectional view showing the preferred embodiment of the present invention gear of Figure 18 additionally having a resilient member coupling a rim to a hub; --.

Column 4, line 23,
after "20" insert -- is --.

UNITED STATES PATENT AND TRADEMARK OFFICE
CERTIFICATE OF CORRECTION

PATENT NO. : 5,452,622
DATED : September 26, 1995
INVENTOR(S) : Paul J. Fenelon

It is certified that error appears in the above-indentified patent and that said Letters Patent is hereby corrected as shown below:

Column 5, line 61,
"in-order" should be -- in order --.

Column 6, line 44,
".order" should be -- order --.

Column 12, line 46,
"5 13" should be -- 513 --.

Signed and Sealed this

Thirtieth Day of April, 1996

Attest:

BRUCE LEHMAN

*Attesting Officer*  *Commissioner of Patents and Trademarks*